June 11, 1940.   J. EGGERT ET AL   2,204,074
PHOTOGRAPHIC PRINTING
Filed May 11, 1936   5 Sheets-Sheet 1

Fig. 1.

Step 1
Copying of blue component into intermediate screen film

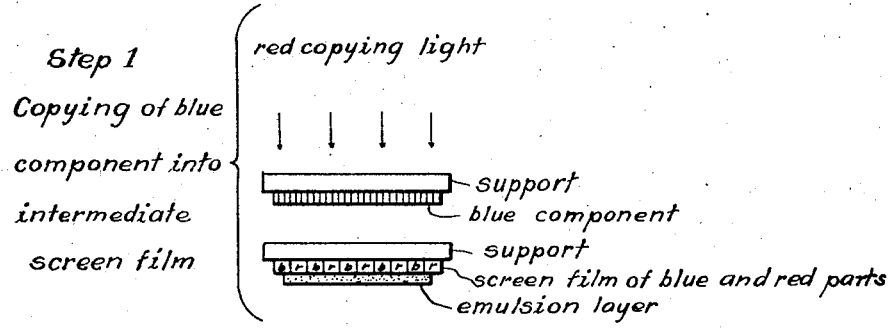

Step 2
Copying of green component into intermediate film of step 1

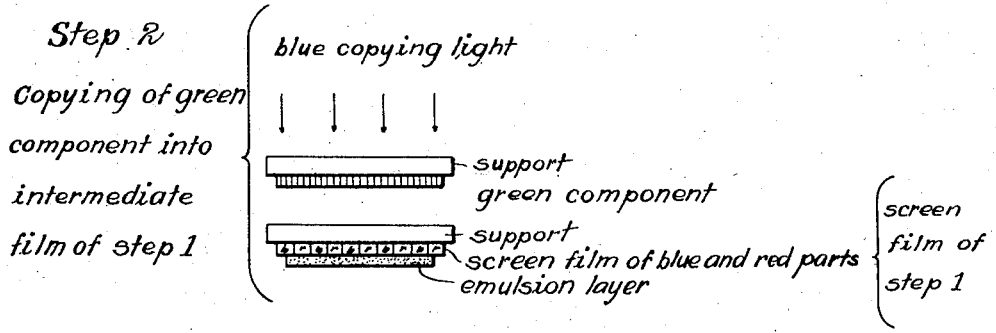

Step 3
Copying of united extracts on screen film of steps 1 and 2 in a single operation on yellow and purple layers of multi-pack copy film simultaneously with copying of red component on blue-green layer of the Multi-pack

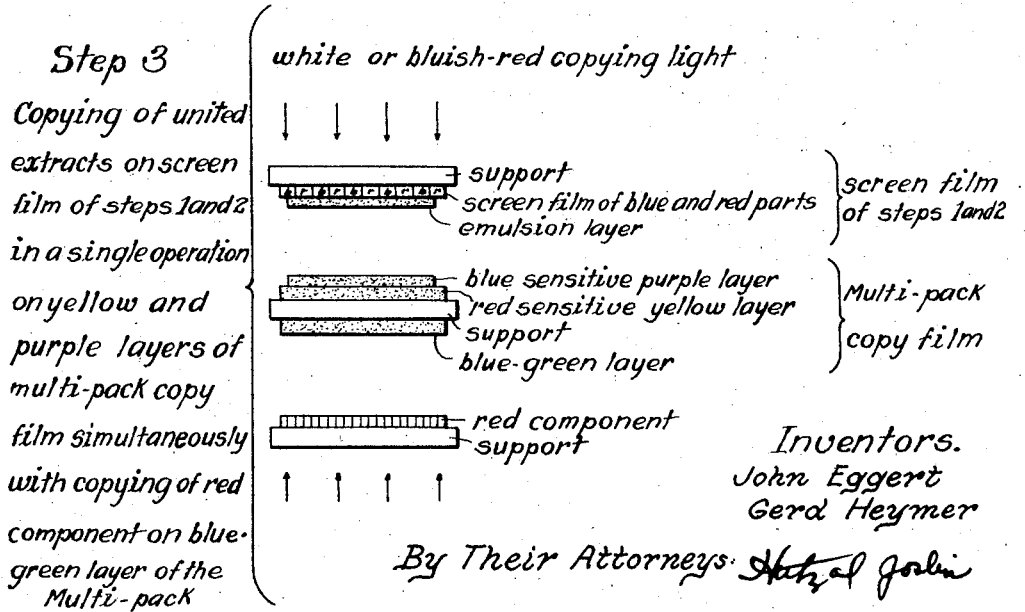

Inventors.
John Eggert
Gerd Heymer
By Their Attorneys

June 11, 1940.  J. EGGERT ET AL  2,204,074
PHOTOGRAPHIC PRINTING
Filed May 11, 1936   5 Sheets-Sheet 2

Fig. 2.

Step 1
Copying the picture on the right with objective onto a lenticular intermediate with one-half of the diaphragm opening covered

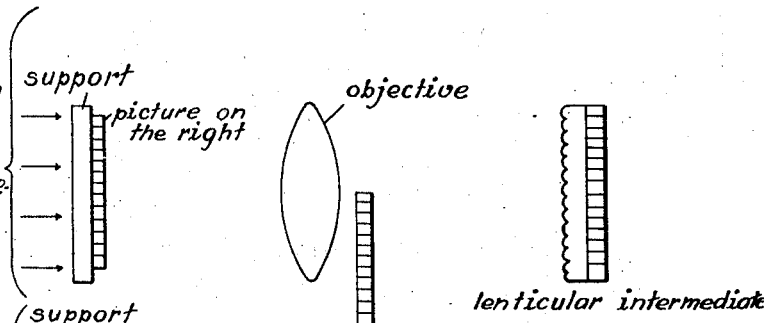

Step 2
Copying of picture on the left on lenticular film of step 1 as in step 1 but with other half of diaphragm opening covered

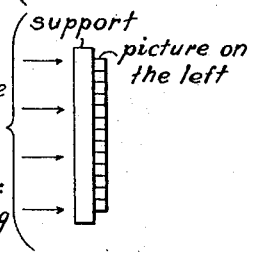

Step 3
Copying of combined extracts on intermediate lenticular onto multi-pack copy film

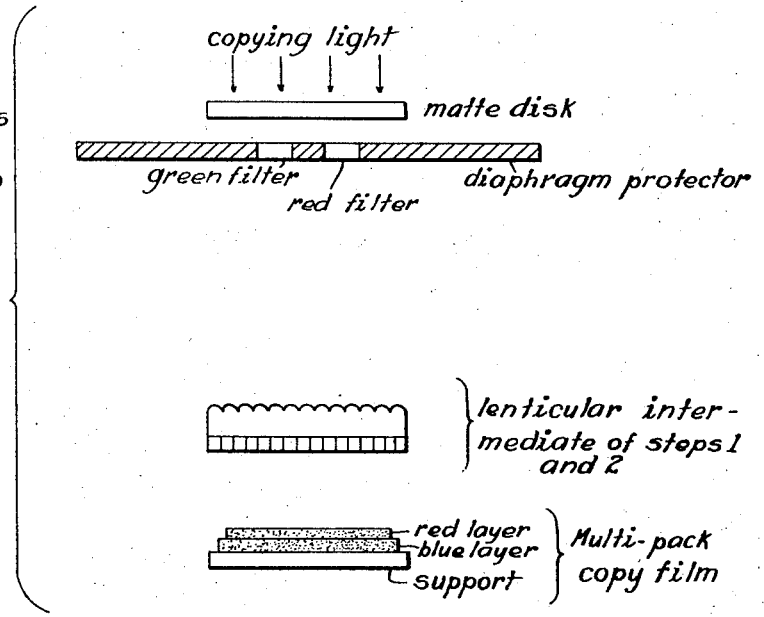

Inventors.
John Eggert
Gerd Heymer
By Their Attorneys

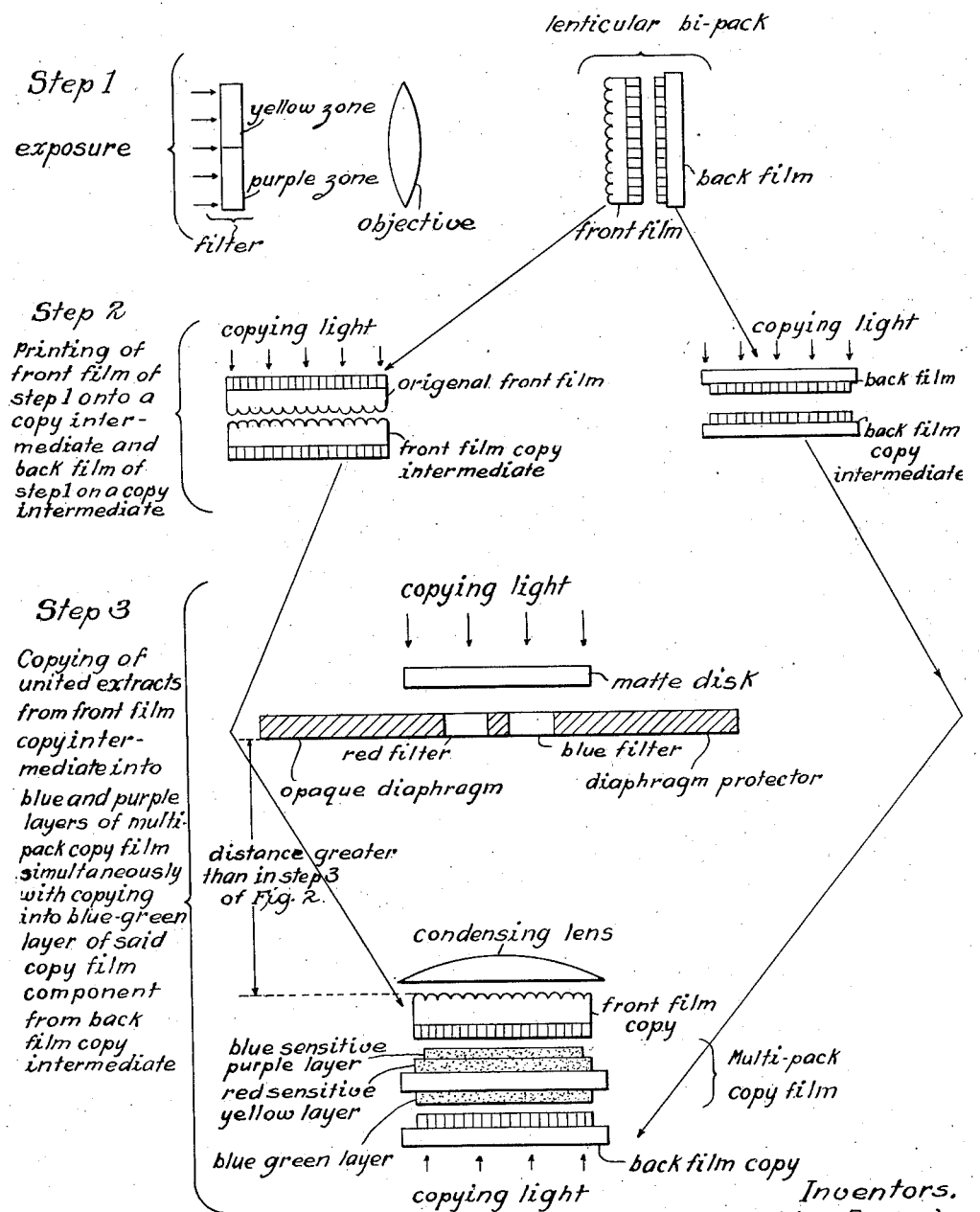

June 11, 1940.          J. EGGERT ET AL          2,204,074
PHOTOGRAPHIC PRINTING
Filed May 11, 1936          5 Sheets-Sheet 4

Fig. 4.

Step 1 { Exposure of lenticular bi-pack as in the first step of Fig.3. }

Step 2
Copying of lenticular front film of step 1 onto an intermediate screen film

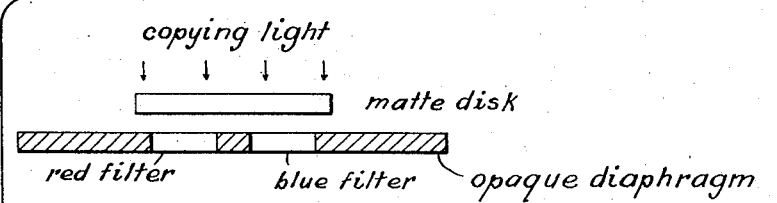

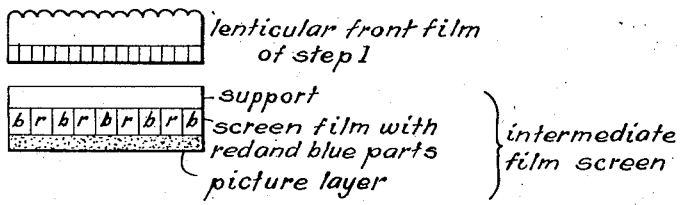

Step 3
Contact copying of back film of step 1 onto a back film intermediate

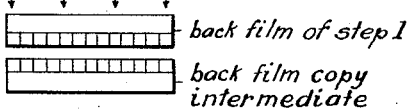

Step 4 { Final copying of screen film intermediate of step 2 onto yellow and purple layers of a multi-pack copy film simultaneously with copying of back film copy of step 3 into blue-green layer of the multi-pack as in Step 3 of Fig.3. }

Inventors.
John Eggert
Gerd Heymer

By Their Attorneys

June 11, 1940.    J. EGGERT ET AL    2,204,074
PHOTOGRAPHIC PRINTING
Filed May 11, 1936    5 Sheets-Sheet 5

Fig.5.

Step 1 { Exposure of lenticular bi-pack as in the first step of Fig.3. }

Step 2
Copying of front film of step 1 onto a multi-pack intermediate film

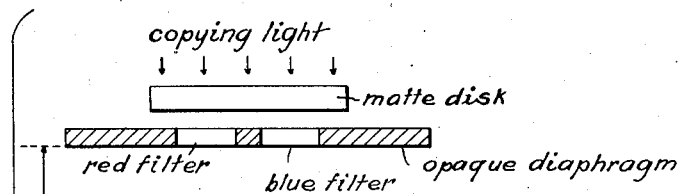

Step 3 { Copying of back film of step 1 onto a back film copy intermediate as in step 3 of Fig.4 }

Step 4
Copying of intermediate film of step 2 on multi-pack copy film simultaneously with copying of intermediate film of step 3 on said multi-pack

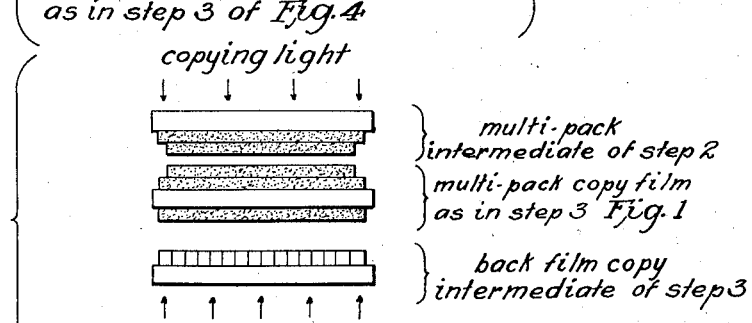

Inventors.
John Eggert
Gerd Heymer
By Their Attorneys

Patented June 11, 1940

2,204,074

UNITED STATES PATENT OFFICE 2,204,074

PHOTOGRAPHIC PRINTING

John Eggert, Leipzig-Gohlis, and Gerd Heymer, Wolfen, Kreis Bitterfeld, Germany, assignors, by mesne assignments, to General Aniline & Film Corporation, New York, N. Y., a corporation of Delaware Application May 11, 1936, Serial No. 79,171
In Germany May 11, 1935

6 Claims. (Cl. 95—2)

This invention relates to photographic printing.

One of its objects is to provide an improved process of photographic printing by way of an intermediate film. Further objects will be seen from the detailed specification following hereafter.

It is often the practice in the photographic industry to make use of an intermediate film between the original exposure and the final print. For example, duplicates may be made from the original negative obtained by the exposure and only these duplicates sent to the printing department for reproduction. In some colour processes the use of such intermediate films is unavoidable because a positive has to be used for printing on the material which is to receive the finished picture; this is the case, for example, in the so-called silver bleaching-out process, according to which the dyestuffs which are contained in the layers and are to constitute the colour picture are bleached out by the action of a reducing agent at those places in the layers at which silver is present. In most cases the production of intermediate films is expensive and their manipulation is generally complicated.

This invention relates to a process for producing colour prints on multi-layer photographic material which avoids the disadvantages associated with the working up of individual intermediate component films. In accordance with the invention the component pictures, especially component colour pictures, are first combined in a single intermediate film and this is printed on the multi-layer photographic material. The intermediate print may be produced as a negative or as a positive.

The invention is illustrated in the accompanying drawings in which Figs. 1 to 5 depict diagrammatically methods of printing according to the present invention.

As the photographic material for the intermediate print there may be used a screen film in which the picture elements differ in their spectral properties in such a manner that component pictures interspersed within one another in the layer can again be separated. To the first of the aforesaid kinds of film belong films having coloured grain, line or cross-screens and to the second kind belong films having a lenticular embossing.

The first stage of the process, that is to say the combination of the component pictures into the intermediate print, will depend upon the properties of the intermediate film which is to be used.

In the case of a photographic material having a colour screen the component pictures are either printed in succession in contact with the aid of filters or are printed simultaneously with the aid of an optical device which projects on to the same film superimposed images of the several component pictures corresponding with one another in their outlines; in the latter case the course of the rays is the reverse of that in taking component pictures with the aid of a device for separating the rays and there are placed in the course of the rays whilst, they are still separated, corresponding filters as described in U. S. Patent No. 2,001,250 to Heymer one of the inventors of this invention. One may proceed in a similar manner when the intermediate print is to be produced on a subtractive colour film.

When the intermediate print is to be produced on a lenticular film the component pictures are printed on the lenticular film according to any of the known processes, for example, by contact printing according to the process described in U. S. Patent No. 1,968,145 to Heymer one of the inventors of the present invention or by projection printing according to the process described in French Specification No. 472,954.

The second stage of the process, in which a final print is made from the intermediate print, corresponds to a certain extent with the first stage of the process for preparing the intermediate print. However, in those processes which involve the use of a colour screen care must be taken that the colours of the particles correspond with the sensitivities of those layers on which they are to be printed. In the case of a lenticular film such a relationship does not come into question.

The following examples illustrate the invention—

*Example 1.*—It is desired to print component pictures, consisting of ordinary component negatives, on to a multi-layer photographic film having on one side yellow and purple layers and on the other side a blue-green layer (see the intermediate film in step 3, Fig. 1). The yellow layer, which adjoins the support, is sensitive to red and the superimposed purple layer is sensitive only to blue. According to the known laws of subtractive colour photography the green component picture has to be printed on the purple layer and the blue component picture on the yellow layer. The component pictures are first combined to an intermediate print on a film having a two-colour line, cross or grain screen composed of blue and red elements as shown in Fig. 1. The blue component picture is printed on the intermediate screen film with the aid of a red filter according to step 1 of Fig. 1 and the green component picture with the aid of a blue filter according to step 2 of Fig. 1. In this manner a green positive is produced under the blue screen elements and a blue positive is produced under the red screen elements. If, now, this intermediate screen film is printed as shown in step 3 of Fig. 1 by means of white or blue-red light on to the yellow and purple layers of the multilayer film each positive is reproduced on the correct layer in the final colour positive. The blue-green layer carried on the other side of the multi-layer film is separately illuminated, for instance, with the aid of an ordinary intermediate positive.

*Example 2.*—For producing a stereo-film two partial negatives which have been taken separately are to be printed on a film having superimposed red and blue-green layers whose colours are complementary to one another according to the so-called "Anaglyph" process. For producing the pictures on the Anaglyph film there are required intermediate positives. In accordance with the invention these intermediate positives are combined in an intermediate print which is used for printing on the Anaglyph film. This intermediate print is obtained according to steps 1 and 2 of Fig. 2 by combining the component negatives on a lenticular film according to one of the processes hereinbefore referred to for printing component pictures on lenticular films; the lenticular film is then printed as shown in step 3, Fig. 2, on to the Anaglyph film with the aid of appropriate filters. If, for example, the red layer is sensitive to red and the blue-green layer is sensitive to blue, one component picture is printed through a red filter which is arranged at the same position with respect to the lenticular film as that which was occupied by the printing diaphragm in preparing the intermediate positive; for printing the other component picture there is used a green filter.

*Example 3.*—A three-colour film is to be prepared from an original obtained by exposure of a so-called lenticular bi-pack according to U. S. Patent 1,968,944 to Heymer one of the inventors of the present invention and as shown in step 1, Fig. 3. The front film, that is to say the lenticular film of the bi-pack used for the exposure is converted into a positive by reversal development. For the final print there is to be used a multilayer colour film such as is described in Example 1 and as the intermediate film there is to be used a lenticular film. For producing the intermediate print the lenticular front film is first printed as shown in step 2, Fig. 3, on the lenticular film by contact printing according to one of the known processes, during which there occurs the known displacement of the filter middle lines. The rear film is printed with its image layer towards the sensitive layer of the lenticular intermediate film also as shown in step 2, Fig. 3. The prints thus produced are now correctly disposed, that is to say not laterally inverted. The lenticular intermediate film is now printed by contact according to step 3, Fig. 3, on the final multi-layer film, there being arranged at that place corresponding with the position of the blue-red filter zone during exposure a red or yellow filter and at the place corresponding with the position of the yellow filter during exposure a blue or blue-green filter. In the production of the final print attention must be paid to the altered convergence of the filter middle lines in the intermediate print; for this purpose, by any suitable means, for example, by curving the film or by arranging a lens against the lenticular surface of the film, (see step 3, Fig. 3) the incidence of the elementary pencils of light rays is altered in such a manner that all the rays emanating from the exposure filter during printing intersect at a point whose distance from the emulsion side of the lenticular intermediate film corresponds with the apparent distance of the filter in the original exposure.

*Example 4.*—As in Example 3 the originals are contained in a lenticular bi-pack and the final print is to be produced on a multi-layer colour film. For the intermediate print there is used a film of the same kind as is used in Example 1, that is to say a film having a colour screen (see the lowermost film of step 2, Fig. 4). The lenticular front film is first printed on the intermediate colour screen film according to the process of U. S. Patent No. 1,874,529 to Heymer one of the inventors of the present invention and as shown in step 2, Fig. 4, there being used in place of the blue-red filter used in the exposure a red or yellow filter and instead of the yellow filter used in the exposure a blue or blue-green filter. The back film of the bi-pack is printed onto a copy intermediate as shown in step 3, Fig. 4. The intermediate prints thus obtained is printed on to a multi-layer printing material (as described in Example 1) according to step 4, Fig. 4.

In lieu of printing the front film on an intermediate screen film, the front film may be printed on a multi-layer material as shown in step 2 of Fig. 5. The back film is copied in the same way as above. As shown in step 4, Fig. 5, the intermediate multi-pack and back film copy are printed from opposite sides into the multi-pack copy film.

The foregoing examples show that the principle underlying the process can be applied in various ways. All cases, however, comprise the essential feature that when intermediate prints are required for printing on multi-layer colour films the complicated and uncertain manipulation of individual intermediate prints is avoided by combining these into a single intermediate print.

What we claim is:

1. A process of producing colored prints on a multi-layer film which comprises printing all partial color pictures made from an object on a screen film and printing the partial color pictures from the screen film on the multi-layer film.

2. A process of producing colored prints on a multi-layer film which comprises printing all partial color pictures made from an object on a lenticular screen film, and printing the partial color pictures from the lenticular film on the multi-layer film.

3. A process of producing colored prints on a multi-layer film which comprises printing all partial color pictures made from an object on a color-screen film, and printing the partial color pictures from the color-screen film on the multi-layer film.

4. A process of producing color prints on a multi-layer film, the layers of which are differently sensitized which comprises printing all partial color pictures made from an object on a screen film and printing the partial color pictures from the screen film on the multi-layer film by means of a printing light the color of which for each partial color picture is equal to the spectral region of sensitivity of the layer of the multi-layer film on which said partial color picture is to be printed.

5. A process of producing color prints on a multi-layer film, the layers of which are differently sensitized which comprises printing all partial color pictures made from an object on a lenticular screen film, and printing the partial color pictures from the lenticular film on the multi-layer film by means of a printing light the color of which for each partial color picture is equal to the spectral region of sensitivity of the layer of the multi-layer film on which said partial color picture is to be printed.

6. A process of producing color prints on a multi-layer film, the layers of which are differently sensitized which comprises printing all partial color pictures made from an object on a color-screen film, and printing the partial color pictures from the color-screen film on the multi-layer film by means of a printing light the color of which for each partial color picture is equal to the spectral region of sensitivity of the layer of the multi-layer film on which said partial color picture is to be printed.

JOHN EGGERT.
GERD HEYMER.